Figure 1:
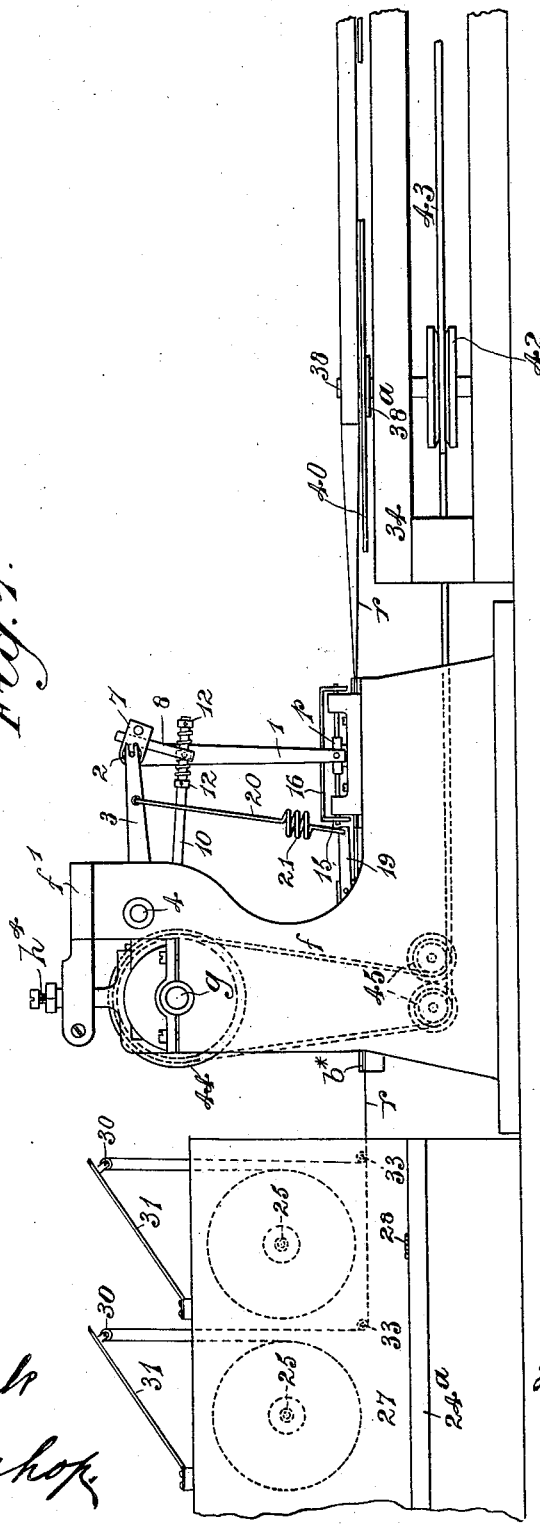

No. 686,510. Patented Nov. 12, 1901.
F. G. CREED.
PERFORATING MACHINE FOR TAPES OF PAPER, &c.
(Application filed Apr. 26, 1901.)
(No Model.) 7 Sheets—Sheet 1.

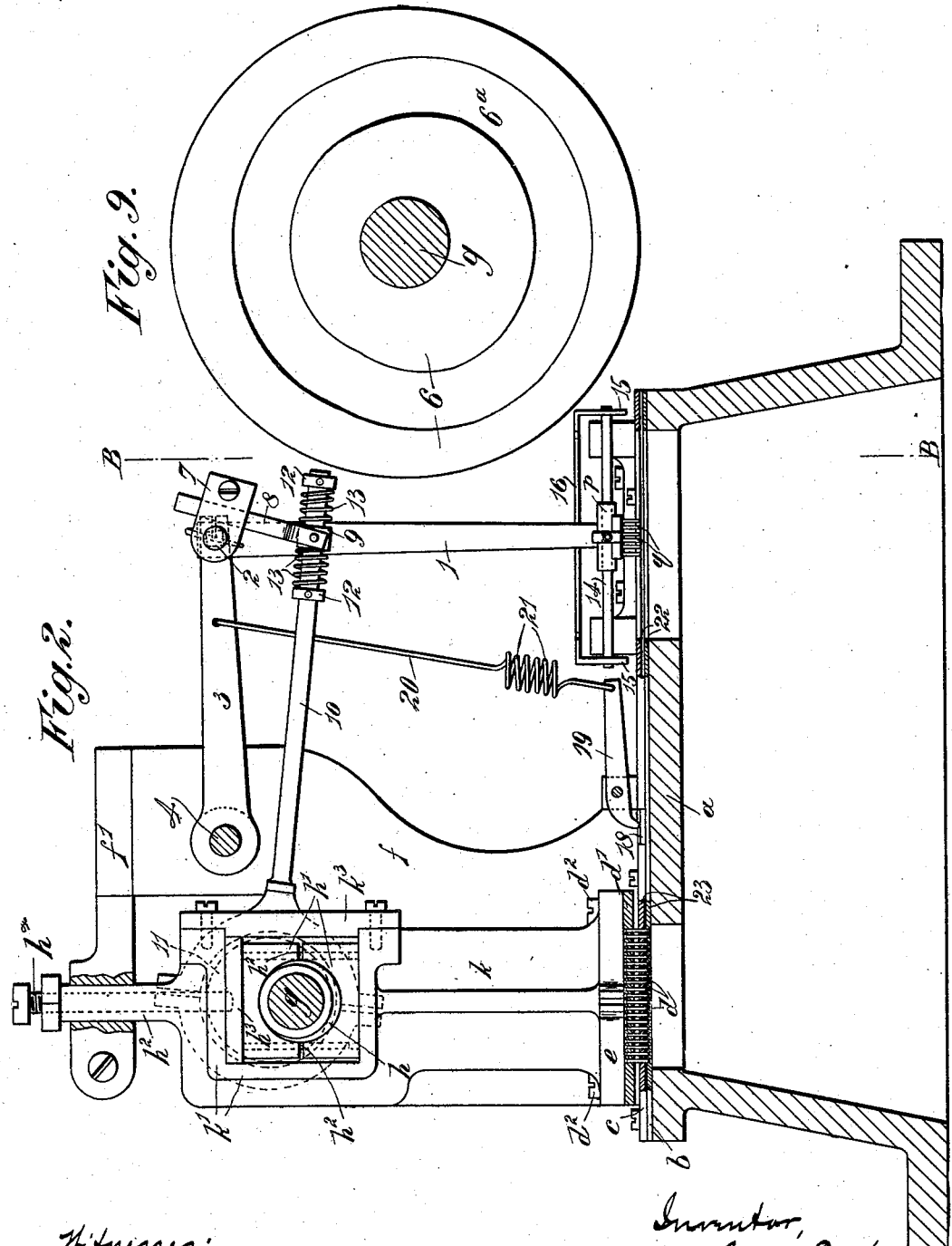

No. 686,510. Patented Nov. 12, 1901.
F. G. CREED.
PERFORATING MACHINE FOR TAPES OF PAPER, &c.
(Application filed Apr. 26, 1901.)
(No Model.) 7 Sheets—Sheet 3.
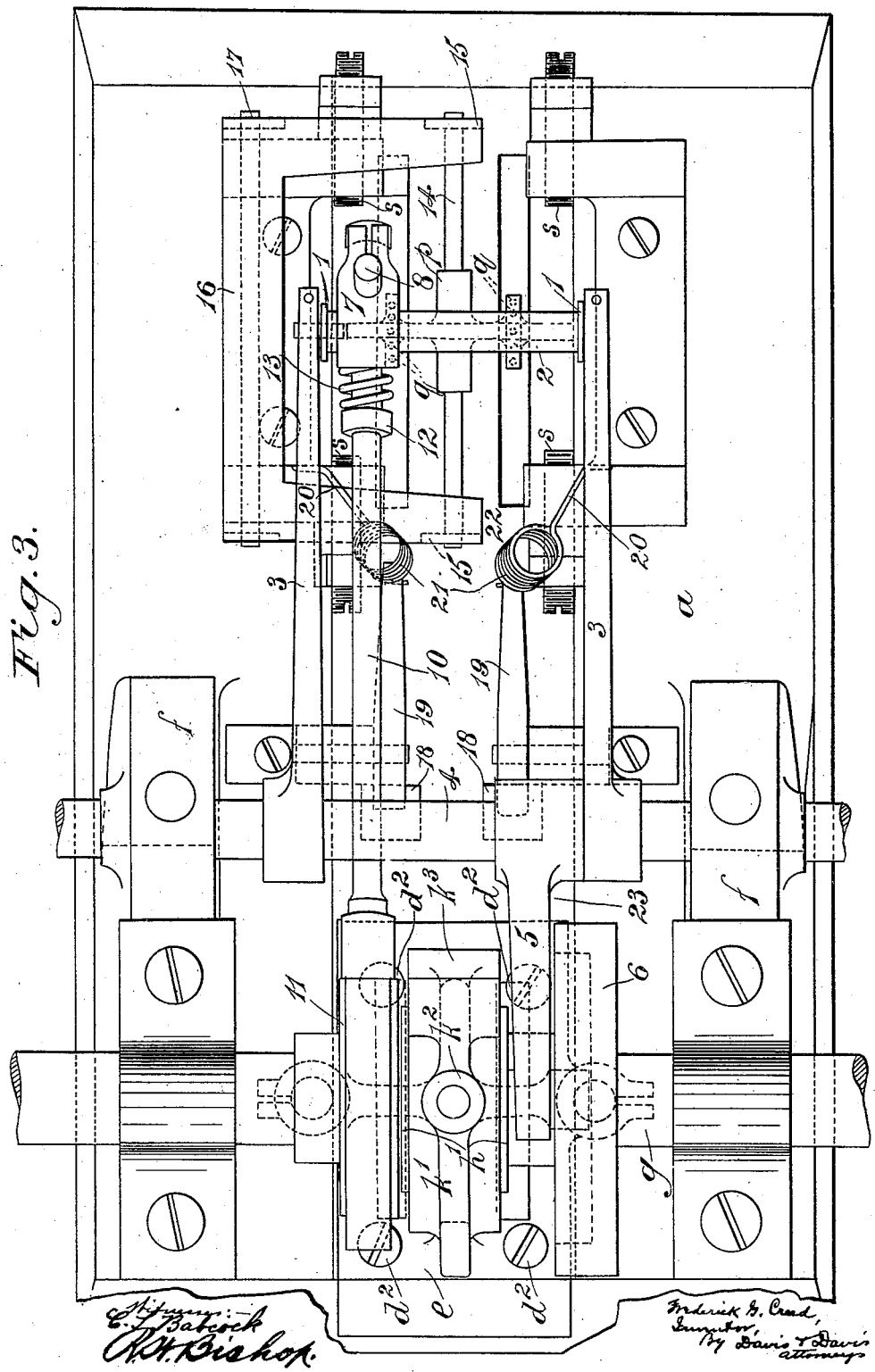

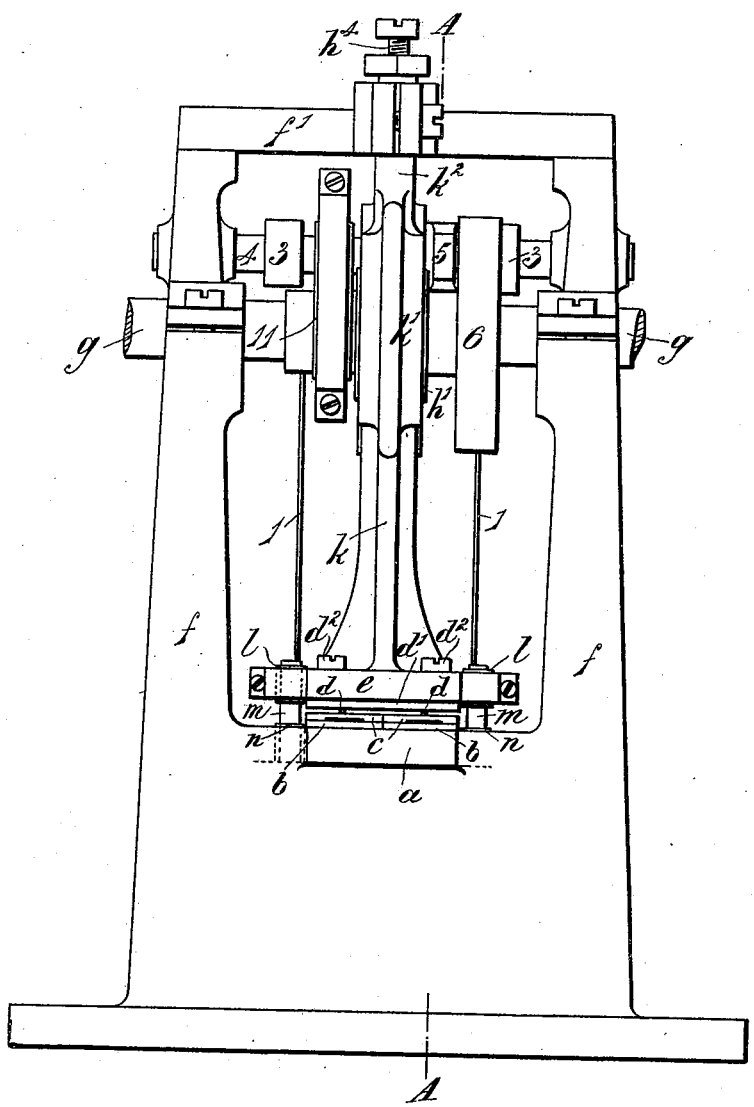

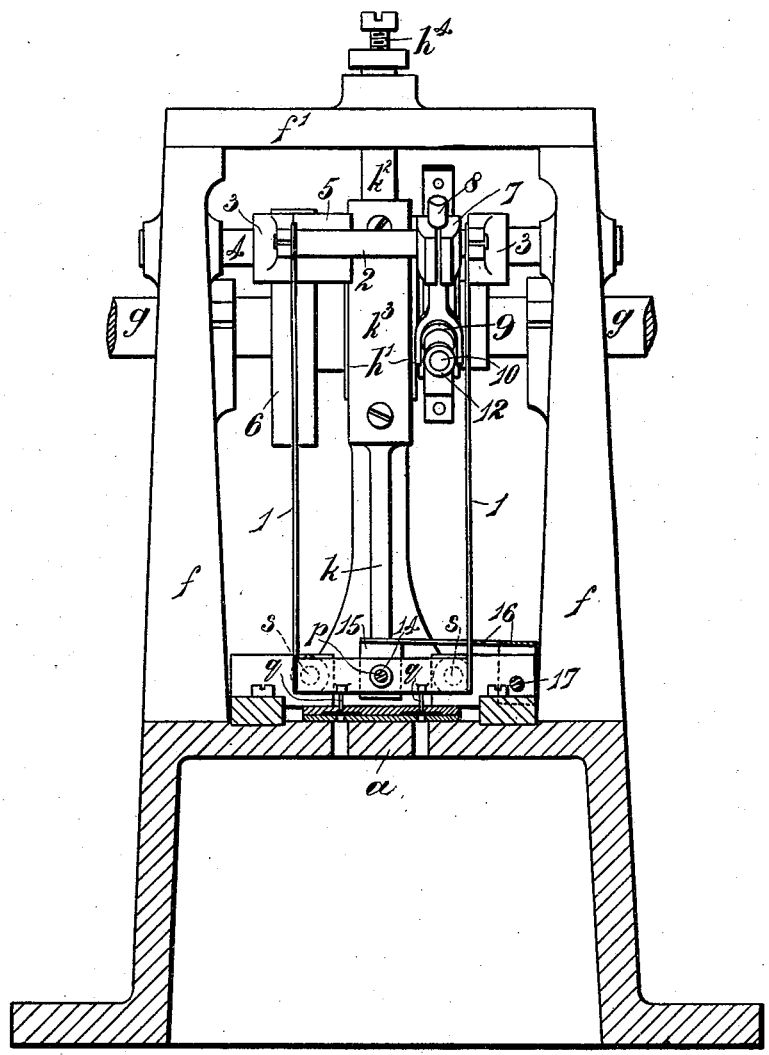

No. 686,510. Patented Nov. 12, 1901.
F. G. CREED.
PERFORATING MACHINE FOR TAPES OF PAPER, &c.
(Application filed Apr. 26, 1901.)

(No Model.) 7 Sheets—Sheet 6.

Witnesses:
C J Babcock
R W Bishop

Inventor,
Frederick George Creed
By Davis & Davis
Attorneys

No. 686,510. Patented Nov. 12, 1901.
F. G. CREED.
PERFORATING MACHINE FOR TAPES OF PAPER, &c.
(Application filed Apr. 26, 1901.)
(No Model.) 8 Sheets—Sheet 7.

Witnesses:
C. T. Babcock
R. W. Bishop

Inventor
Frederick George Creed
By Davis & Davis
Attorneys

UNITED STATES PATENT OFFICE.

FREDERICK GEORGE CREED, OF LENZIE, SCOTLAND, ASSIGNOR OF ONE-TENTH TO WILLIAM ARTHUR COULSON, OF GLASGOW, SCOTLAND.

PERFORATING-MACHINE FOR TAPES OF PAPER, &c.

SPECIFICATION forming part of Letters Patent No. 686,510, dated November 12, 1901.

Application filed April 26, 1901. Serial No. 57,640. (No model.)

*To all whom it may concern:*

Be it known that I, FREDERICK GEORGE CREED, a subject of the King of Great Britain and Ireland, residing at Lenzie, in the county of Lanark, Scotland, have invented Improvements in Perforating-Machines Suitable for Making Holes in Tapes of Paper and in other Substances for Various Purposes, of which the following is a specification.

This invention has reference to improvements in perforating-machines for making feed-holes in tapes or webs (hereinafter called "tapes") of paper or other material such as used for controlling telegraph-transmitters, type-writing and type-setting machines, cinematographs, and the like or for any other purpose for which accurately-spaced feed-holes are required, the objects being to simplify the construction and improve the working of such machines. A machine of this kind according to this invention comprises die plates and punches, a punch-carrier, means for imparting to it reciprocating motion in a vertical sense, a traveler or feeder (hereinafter called the "traveler") for moving the tapes into position for each successive punching operation, and means for imparting to the said traveler downward, forward, upward, and backward movements in such wise as at the proper times to cause the traveler to become engaged with the tapes, to move them forward, to become disengaged from them, to return to its rearward position, and to become again engaged with the tapes in readiness for the next forward or feeding movement, and so on, the feeding stroke of the traveler being determined by adjustable stops, between which it is moved by levers, themselves actuated from the main shaft by suitable actuating means embodying spring devices, such as to allow the actuating rods or connections to travel through a greater distance than the adjacent parts of the levers, thus affording an interval between the completion of each forward and backward stroke of the traveler and the commencement of its succeeding stroke in the opposite direction. The machine also comprises means for clamping or holding down the tapes during withdrawal of the traveler therefrom after its forward movement and until the traveler reengages the tapes, and also means for feeding tapes to the perforating portion of the machine and means for reeling the perforated tapes.

The invention consists in the novel features of construction and the combination and arrangement of parts and details of construction, all as hereinafter fully described, and set forth in the claims.

Figure 5:
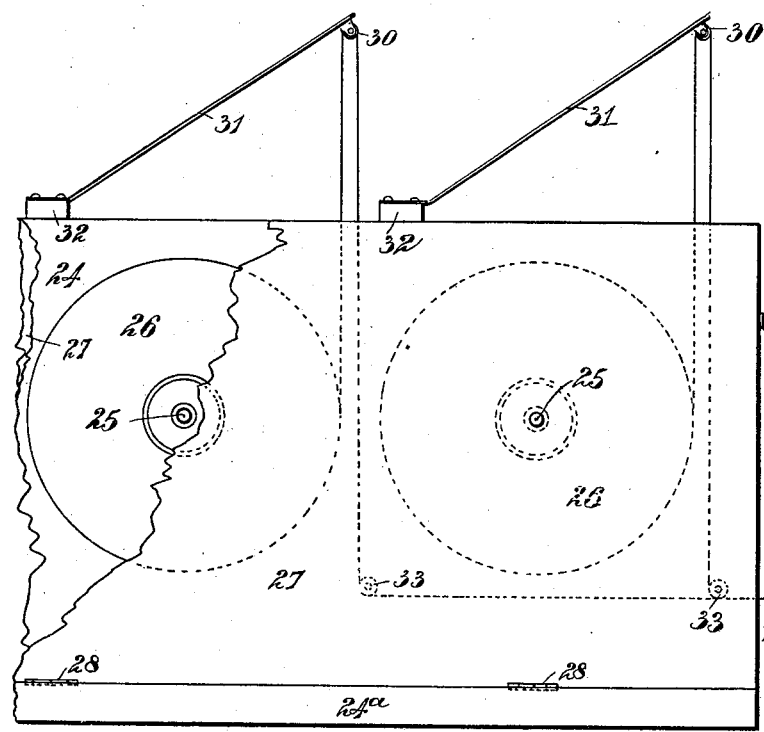
Figure 6:
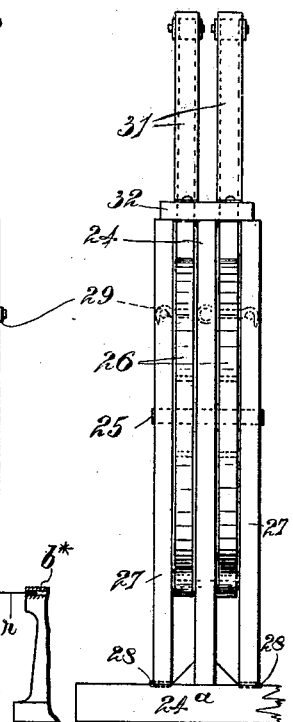
Figure 7:
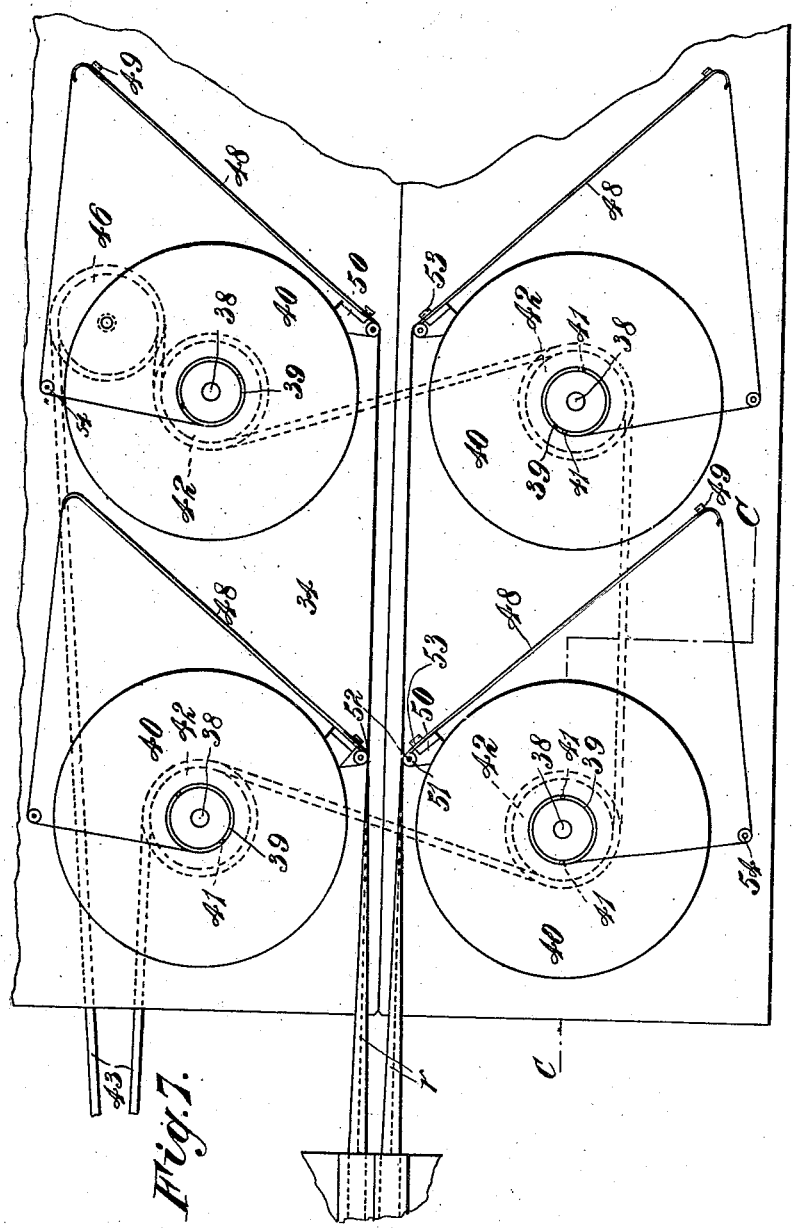
Figure 8:
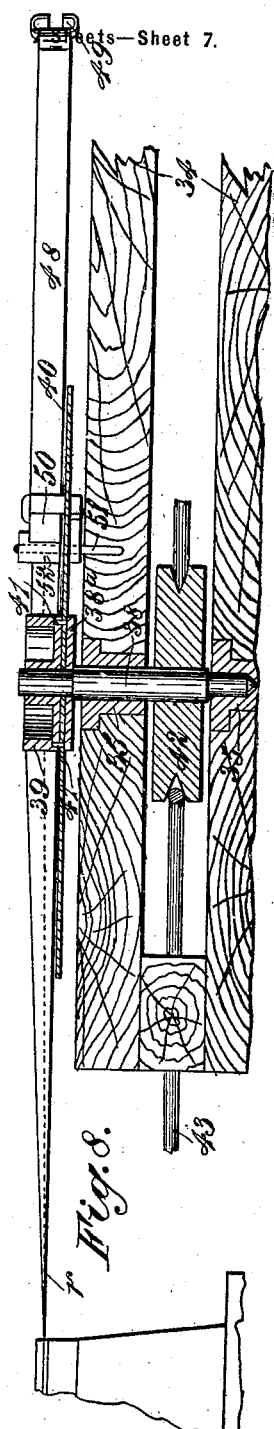

In the accompanying illustrative drawings, Figure 1 shows in side elevation and to a smaller scale than the remaining figures one construction of perforating-machine according to this invention adapted to perforate two tapes or two sets of tapes arranged side by side. Fig. 2 shows the perforating portion of the machine, partly in side elevation and partly in longitudinal section, on the line A A of Fig. 4. Fig. 3 shows the same in plan, and Fig. 4 is a view of the left-hand end thereof. Fig. 4$^a$ is a cross-section on the line B B of Fig. 2. Fig. 5 shows in side view, and Fig. 6 in rear end elevation, the means for feeding tapes to the perforating portion of the machine. Fig. 7 shows in plan the means for reeling the perforated tapes delivered from the perforating portion of the machine. Fig. 8 is a part-vertical section on the line C C of Fig. 7. Fig. 9 is a detail view showing the face of a cam hereinafter referred to.

In the arrangement shown, $a$ is a bed having a flat horizontal base on which are fixed two pairs of die-plates $b$ $c$, arranged side by side, and above them are the punches $d$, of which there are two rows carried by plates $d'$, fixed by screws $d^2$ to the under side of a vertically-movable plate $e$, hereinafter called the "punch-carrier."

$f$ represents main standards fixed to the bed $a$ at opposite sides of the punch-carrier and connected together at the top by a cross-piece $f'$.

$g$ is a rotary main driving-shaft journaled across the top of the standards $f$. Upon this shaft midway between the standards and above the punch-carrier is fixed an eccentric $h$, which is connected to the punch-carrier by means of a rod $k$ and strap $k'$ or other suitable connection for the purpose of imparting to the punch-carrier the required up and down movements. In the example shown the punch-carrier $e$ and rod $k$, with strap portion $k'$, is cast in one piece of metal, which is guided in a perfectly vertical manner and prevented from moving laterally by causing bushes L, fixed in opposite sides of the punch-carrier $e$, to slide upon vertical guide-pins $m$, held in tubular holders $n$, fixed in the bed $a$, and by causing a vertical extension $k^2$ of the rod $k$ to slide in a vertical guideway in the cross-piece $f'$. The eccentric $h$ works within a split eccentric-block $h'$, the two portions of which are held together laterally by steady-pins $h^2$ and are adapted to work horizontally to a small extent in a guideway in the strap portion $k'$, which is provided with a removable cap-piece $k^3$. Vertical play of the split eccentric-block in the strap portion $k'$ is prevented and wear taken up by a plate $h^3$, set up by a screw $h^4$.

$p$ is a traveler provided with two longitudinal rows of teeth or pins $q$, wherewith to engage and draw the punched tapes $r$ endwise. It is suspended between the lower ends of two depending lever-arms 1, which impart to it to-and-fro movements between adjustable stops $s$. The lever-arms 1 are fixed to a rock-shaft 2, mounted in the ends of a pair of lever-arms 3, fixed to a rock-shaft 4, that is journaled in the standards $f$ and to which is fixed another lever-arm 5. The three lever-arms 3 and 5, with shaft 4, constitute, in effect, a single lever, which is operated by a cam 6 on the main shaft $g$ and imparts to the traveler $p$ its downward and upward or engaging and disengaging movements. The cam 6 shown is a disk in which is formed a cam-groove $6^a$, Fig. 9, into which extends a roller on the end of the lever-arm 5. To the rock-shaft 2 is fixed a bent lever-arm which in the example consists of two parts—viz., 7 and 8—whereof 7 is fixed directly to the said rock-shaft and 8 is adjustably fixed in the split end of 7 and extends downwardly at right angles thereto. The lower end of the part 8 is forked and jointed to a collar 9, through which extends a rod 10, itself actuated from the main shaft $g$ through an eccentric 11, the said rod being provided with collars 12 at the respective sides of the lever-arm 8 and collar 9, between which and each collar 12 a coiled spring 13 is interposed. The arrangement is such that the stroke of the eccentric 11 is given to the levers 1 7 8 not directly, but through the medium of the coiled springs 13. The length of the lever-arms 1 is or may be so adjusted that a quarter of a revolution of the main shaft $g$ (starting from the proper point) will suffice to give the traveler $p$ its full stroke in either direction, these quarters being understood to be the diametrically opposite ones. The alternate quarter-revolutions will in this case be employed to compress one or other of the coiled springs 13 at each end of the stroke, thus holding the traveler against the adjustable stops $s$ and giving time for the operation of raising or lowering the traveler, which has to be effected at these intervals.

To obviate radial movement of the traveler $p$, due to the radial movement imparted to the lever-arms 1, that carry it, the traveler is mounted and able to slide upon a pin or rod 14, held between the arms 15 of a frame 16, pivoted by a pin 17* parallel to the direction of motion of the travel, so that the rod 14 will keep the traveler $p$, with its teeth $q$, constantly vertical in order to insure accurate engagement and disengagement, while the slight rise and fall of the traveler, caused by the radial motion of the lever-arms 1, that carry it, is corrected by a suitable formation of the cam-groove, (shown at $6^b$ $6^b$, Fig. 9.) The radial motion imparted to the rod 14 by the pivoted frame 16 may be corrected, if desired, by mounting the ends of the rod in vertical slots formed in suitable brackets or studs fixed to the base A and by horizontally slotting the holes $15^a$, through which the rod passes, in the arms 15 of the said frame 16.

For clamping or holding down the tapes $r$ during withdrawal of the traveler $p$ therefrom after its forward movement and until the traveler reëngages the tapes there is provided an arrangement comprising clamping-plates 18, Figs. 2 and 3, under which the tapes are caused to pass in going from the dies $b\,c$ to the traveler $p$. These clamping-plates are each adapted, according to the example shown, to be forced downward by one arm of a lever 19, the other arm of which is connected through a wire connection 20, having a coiled spring 21 in its length, to one of the lever-arms 3, which control the rise and fall of the traveler, so that the levers 19 are caused to press the plates 18 firmly down upon the tapes $r$ when the teeth $q$ of the traveler are withdrawn. 22 indicates slotted plates (which may be merely prolongations of the guide-plates 23 of the dies $b\,c$) fixed under the traveler between which the tapes pass, and the upper of which serves to prevent the tapes $r$ from following up the traveler when it is lifted for the purpose of being disengaged from the tapes.

An arrangement for feeding tapes to the perforating-machine to be perforated and for reeling the perforated tapes is shown in Figs. 5 to 8, inclusive, and is as follows: At that side of the machine at which the tapes $r$ enter the dies $b\,c$ is a bed or support $24^a$, carrying a vertical board or frame 24, in which are fixed one or more spindles 25 of small diameter, upon which or each of which reels 26 are mounted, each reel being free to turn easily and independently upon the said spindle and to carry one of the coils of tape to be perforated. The number of reels will depend upon the number of coils of tape to be perforated. When there are two sets of dies and punches, as in the example, each spindle 25 will carry two reels 26. If two or more tapes are to pass simultaneously through each die and be punched together, there will be two or more spindles with sets of reels. In the example there are two spindles 25, each carrying two reels 26. 27 indicates boards hinged at 28 to the bed $24^a$ and held in place at opposite sides of the board 24 by a hook 29 for the purpose of keeping the coils of tape and reels in place on the spindles without binding them and of allowing of the ready renewal of the coils of tape. At a higher level than each reel 26 is a corresponding pulley 30, that is elastically supported, as by a light spring-blade 31, from any suitable support 32. At a lower level—say level with the die-slots $b^*$, through which the tapes have to pass—is a guide-roller 33. The tape $r$ from each reel 26 passes up to and over the corresponding elastically suspended or supported pulley 30, then down to and under the roller 33, and into the proper die-slot $b^*$. With this arrangement the spring suspension or support of the pulleys 30 is intended to prevent forward throw of the tapes $r$ from being communicated too sharply to the reels 26, and thus to obviate the too free unreeling of the tapes, as well as to moderate the drag upon the traveler $p$.

At that side of the machine whence the perforated tapes $r$ issue is a stationary support 34, provided with bearings 35, in which are mounted vertical driving-spindles 38. Each of these spindles is provided with a flange $38^a$ to support and drive a reel 39, which is provided at its lower end with a rim or flange 40 in frictional driving-contact with the flange $38^a$ on the spindle 38, so that the reel and spindle tend to rotate together; but the reel can be held stationary when desired, while the shaft continues to rotate. The flange 40 may, as shown, be formed by a separate disk, to which the reel 39 is detachably connected by driving-pins 41, so that the reel can be readily removed from and replaced upon the driving flange and spindle. The spindles 38, carrying the reels 39, which correspond in number to the tapes that are being perforated, are suitably rotated at such a speed that, assuming the reels to rotate with their spindles, their surface speed will exceed the speed at which the tapes issue from the machine. In the example each of the spindles 38 has fixed to it a driving-pulley 42, by which it is rotated by an endless cord 43, that is common to all the pulleys 42, and is driven by a pulley 44 on the main shaft $g$, the said cord being led around guide-pulleys 45 and a tightening-pulley 46. At a point near to the periphery of the rim or flange 40 of each reel 39 is pivoted a light spring-lever 48, through a guide 49 in the free end of which the corresponding tape $r$ passes before being wound upon the reel, the said lever being so arranged that whenever its reel 39 begins to travel faster than the machine is feeding the tape the consequent tension of the tape will cause the spring-lever 48 to be drawn more or less firmly against the rim or flange 40 of the reel at a point near the pivot of the lever, and thus to act as a brake upon the reel, which brake will be applied more and more firmly until the reel stops, but will release the reel when the feed of the tape permits. In the example the spring-lever 48 is a metal blade fixed to a carrier 50, that acts as a brake-block, and is pivoted to a pin 51, fixed to the support 34, and provided with a guide-pulley 52, that guides the issuing tape over the spring-lever, which is also provided at its rear end with a tape-guide 53.

54 is a guide-pulley pivoted to the support 34.

With the arrangement described each reel 39 can take up its own tape independently and roll it up sufficiently tight without dragging the holes out of pitch in the machine.

The number of tapes punched simultaneously between each die $b\ c$ and its corresponding punches $d$ can be varied, the number of reels 26 and 39 being varied to suit.

The operation of the machine is as follows: Assuming the main eccentric to be at the top center and the punch-carrier $e$ and punches $d$ in their uppermost positions, the traveler $p$ will be in engagement with the tapes $r$ and at the middle of its forward or feed stroke. From this point one-eighth of a revolution of the main shaft $g$ will bring the traveler into contact with the forward stops $s$ and compression of one of the coiled springs 13 will begin. During the next quarter-revolution the traveler will be held against the forward stops by the said compression while the punches being forced down will commence the perforation of the tapes. In the middle of this same quarter-revolution also the cam 6 will cause the traveler to be raised clear of the tapes, the levers 9 of the clamping-plates 18 being simultaneously applied to hold the tapes in place. In the next or third quarter-revolution the traveler $p$ will be moved backward until it reaches the rearward set of stops $s$, the perforation will be completed, and the punches $d$ will begin to be withdrawn, the traveler meanwhile being held clear of the tapes. During the fourth quarter of the revolution the traveler will be held against the rearward stops by compression of the other coiled spring 13, the cam 6 will cause the traveler $p$ to descend and reëngage the tapes, the action of the levers of the clamping device will be slackened, and the punches $d$ be fully withdrawn from the tapes. A new revolution will now commence, in the first quarter of which the traveler $p$ will feed the tapes forward the full stroke, and the punches $d$ will reach the top of their stroke and begin to descend, the other operations following in the order already described.

In machines such as referred to the dies $b\ c$ may be made up in the usual manner and be fixed firmly upon the base-plate $a$, the punches $d$ being held in plates fixed to the bottom flange of the punch-carrier $e$ in such a way that they will pitch fairly into their respective holes in the dies.

The dies $b\ c$, slots, rows of punches $d$, and the traveler $p$ may of course be arranged to take tapes of varying breadth and thickness and to produce the rows of perforations either centrally or at any required distance from the edges of the tape.

As will be evident, parts of my invention may be applied in machines differing in construction more or less from those hereinbefore described or referred to by way of example. Also it will be evident that various changes could be made in the details of construction of the machine without departing from the spirit and scope of the invention so long as the relative arrangement of parts shown in the drawings or the mode of operation described in the specification is preserved.

What I claim is—

1. A perforating-machine suitable for making feed-holes in tapes and other material, comprising a pair of perforated dies between which the material passes, punches arranged to work through said dies, a punch-carrier, means for reciprocating the same, and a traveler adapted to intermittently move the material into position for each successive punching operation.

2. A perforating-machine suitable for making feed-holes in tapes and other material, comprising a pair of perforated dies between which the material passes, punches arranged to work through said dies, a punch-carrier, means for reciprocating the same, a traveler adapted to intermittently move the material into position for each successive punching operation, and means for imparting to said traveler downward, forward, upward and backward movements, substantially as described for the purpose specified.

3. A perforating-machine suitable for making feed-holes in tapes and other material, comprising dies between which the material passes, punches arranged to work therethrough, a punch-carrier, means for reciprocating the same, a traveler adapted to intermittently move the material into position for each successive punching operation, means for imparting to said traveler downward, forward, upward and backward movements, stops adapted to determine the feeding stroke of said traveler, and means for enabling said traveler to dwell between the completion of each forward and backward stroke and the commencement of its next succeeding stroke in the opposite direction.

4. A perforating-machine suitable for making feed-holes in tapes and other material, comprising a pair of perforated dies between which the material passes, punches arranged to work through said dies, a punch-carrier, means for reciprocating the same, a traveler adapted to intermittently move the material into position for each successive punching operation, and means for clamping or holding said material during withdrawal of said traveler therefrom and until the traveler reengages it.

5. A perforating-machine suitable for making feed-holes in tapes and other material, comprising dies between which the material passes, punches arranged to work therethrough, a punch-carrier, means for reciprocating the same, a traveler adapted to intermittently move the material into position for each successive punching operation, means for clamping or holding said material during withdrawal of said traveler therefrom and until the traveler reengages it, means for feeding material to be perforated to said dies, and means for intermittently winding up the perforated material delivered by said traveler.

6. A perforating-machine suitable for making feed-holes in tapes and other material, comprising dies between which the material passes, punches arranged to work therethrough, a punch-carrier, means for reciprocating the same, a traveler adapted to intermittently move the material into position for each successive punching operation, means for imparting to said traveler downward, forward, upward and backward movements, adjustable stops adapted to determine the feeding stroke of said traveler, means for enabling said traveler to dwell between the completion of each forward and backward stroke and the commencement of its next succeeding stroke in the opposite direction, and means for clamping or holding said material during withdrawal of said traveler therefrom and until the traveler reengages it.

7. A perforating-machine suitable for making feed-holes in tapes and other material, comprising dies between which the material passes, punches arranged to work therethrough, a punch-carrier, means for reciprocating the same, a traveler adapted to intermittently move the material into position for each successive punching operation, means for imparting to said traveler downward, forward, upward and backward movements, adjustable stops adapted to determine the feeding stroke of said traveler, means for enabling said traveler to dwell between the completion of each forward and backward stroke and the commencement of its next succeeding stroke in the opposite direction, means for clamping or holding said material during withdrawal of said traveler therefrom and until the traveler reengages it, means for feeding material to be perforated to said dies, and means for intermittently winding up the perforated material delivered by said traveler.

8. In a perforating-machine suitable for making feed-holes in tapes and other material, the combination with perforating and clamping devices for perforating and holding the material to be perforated, of a traveler provided with pins adapted to engage the holes made in said material, stops between which said traveler reciprocates, guiding means for said traveler, a suspended lever connected to said traveler, means for raising and lowering said lever, and means acting through springs for oscillating said traveler between said stops.

9. In a perforating-machine suitable for making feed-holes in tapes and other material, the combination with perforating and clamping devices, of a traveler provided with pins on its under side, a pivoted frame provided with a guide-rod upon which said traveler is mounted to reciprocate, a raising and lowering lever mounted above said traveler, a pair of lever-arms suspended from said lever and provided with a rocking arm, means for intermittently rocking said lever, a rod provided with springs arranged to actuate said rocking arm in opposite directions and oscillate said lever-arms, and means for reciprocating said rod, substantially as described for the purpose specified.

10. In a perforating-machine suitable for making feed-holes in tapes and other material, the combination of perforating mechanism, a traveler adapted to engage the perforated material, stops between which said traveler works, means for intermittently raising and lowering said traveler, spring-containing means for oscillating said traveler between said stops, a clamping device adapted to hold said material stationary during withdrawal of said traveler therefrom and until the traveler reëngages it, and yielding connecting means between said clamping device and the means for raising and lowering said traveler, said connecting means acting to apply said clamping device when the said traveler rises.

11. In a perforating-machine suitable for making feed-holes in tapes and other material, the combination with perforating and clamping mechanism, of a traveler provided on its under side with pins adapted to engage the holes in the perforated material, means for imparting downward, forward, upward and backward movements to said traveler, and slotted plates fixed under said traveler, between which the perforated material passes, through the slots in which the traveler-pins make their forward strokes, and the upper of which acts as a stop to prevent the perforated material rising with the traveler-pins, substantially as described.

12. A perforating-machine comprising a frame, a pair of die-plates fixed thereto and between which the material to be perforated passes, vertical punches adapted to pass through said dies and the material between them, a vertically-guided punch-carrier, a main driving-shaft supported in said frame above said dies, an eccentric fixed on said shaft and adapted to reciprocate said punch-carrier, a guideway for the perforated material, a clamping-plate acting through a hole in the top of said guideway, a lever adapted, when operated, to press said clamping-plate downward, a pair of longitudinally-slotted plates forming a continuation of said guideway, a pivoted frame with longitudinal guide-rod, a traveler mounted to slide on said guide-rod and provided with pins adapted to extend through said slotted plates and holes in the perforated material between them, adjustable stops between which said traveler can move longitudinally, a raising and lowering lever pivoted to said frame, a rock-shaft carried by one arm of said lever and provided with a pair of dependent lever-arms connected to said traveler and with a bent operating-arm, a cam fixed on said driving-shaft and adapted to intermittently raise and lower the other arm of said lever, an eccentric fixed to said driving-shaft and fitted with a strap having a rod that extends through said bent operating-arm and is provided with collars at opposite sides of said arm, coiled springs encircling said rod and arranged between the opposite sides of said operating-arm and the collars on said rod, and an elastic connection between the clamp-operating lever and the arm of the lever that lifts the traveler, substantially as described for the purposes specified.

13. In a perforating-machine suitable for making feed-holes in tapes and other material, the combination with perforating mechanism, and means for intermittently moving the material to be perforated into position for each successive punching operation, of means for feeding said material to said perforating mechanism, said means comprising a reel-support, a reel mounted to rotate thereon and adapted to carry the material to be perforated, and an elastically-supported pulley over which the material is passed from said reel and led to the perforating mechanism.

14. In a perforating-machine suitable for making feed-holes in tapes and other material, the combination with perforating mechanism, and means for intermittently moving the material to be perforated into position for each successive punching operation, of means for feeding said material to said perforating mechanism, said means comprising a vertical support, a horizontal axle fixed thereto, a reel mounted to revolve on said axle, a spring-arm fixed at one end to said support and provided at the other end with a guide-pulley over which material from said reel is passed, and a guide-pulley around which said material is led to said perforating mechanism, substantially as described.

15. In a perforating-machine suitable for making feed-holes in tapes and other material, the combination with perforating mechanism, and means for intermittently moving the material to be perforated into position for each successive punching operation, of means for feeding the said material to said perforating mechanism, said means comprising a vertical support, two or more reels mounted to freely rotate thereon and arranged one in front of the other and in the same vertical plane, two or more spring-blades each fixed at one end above one of said reels and provided at its other and free end with a guide-pulley over which the material coming from the corresponding reel passes, and guide-rollers mounted on said support and arranged to guide the lengths of material passing downward from the spring-supported pulleys, horizontally and one above another to the perforating mechanism, substantially as described.

16. In a perforating-machine having two sets of dies and punches and a traveler adapted to draw two tapes or two sets of tapes in an intermittent manner through said dies, of feeding mechanism comprising a vertical support, horizontal axles fixed therein and projecting through the opposite sides thereof, reels mounted to rotate on the projecting ends of said axles, spring-blades each fixed at one end above one of said reels and provided with a guide-pulley at the opposite free end, lower guide-pulleys journaled to said vertical support, and hinged boards arranged to be moved into a position parallel to and at opposite sides of said support and adapted to be held in that position, substantially as described for the purpose specified.

17. In a perforating-machine suitable for making feed-holes in tapes and other material, the combination with perforating mechanism, and means for intermittently moving the material to be perforated into position for each successive punching operation and for delivering the perforated material in a forward direction, of means for winding up the issuing material, said means comprising a reel whereon the perforated material is to be wound, friction driving means adapted to rotate said reel at a greater peripheral speed than the material is delivered, and a brake device over which said material is led to said reel and which is pressed against said reel with more or less pressure when the material is subjected to tension.

18. In a perforating-machine suitable for making feed-holes in tapes and other material, the combination with perforating mechanism, and means for intermittently moving the material to be perforated into position for each successive punching operation and for delivering the perforated material in a forward direction, of means for winding up the issuing material, said means comprising a reel whereon the perforated material is to be wound, friction driving means adapted to rotate said reel at a greater peripheral speed than the material is delivered, and a spring-actuated braking device over which said material is led to said reel and which is pressed against said reel by tension of said material.

19. In a perforating-machine suitable for making feed-holes in tapes and other material, the combination with perforating mechanism, and means for intermittently moving the material to be perforated into position for each successive punching operation and for delivering the perforated material in a forward direction, of winding-up mechanism comprising a support, a vertical driving-spindle mounted to rotate therein and provided with a frictional driving flange or collar, a reel detachably mounted on said spindle and having a rim or flange in frictional driving contact with the said spindle flange or collar, means for rotating said spindle and reel so that the latter shall have a greater peripheral speed than the speed of the issuing material, a spring-arm pivoted at one end to said support and provided at that end with a brake-block adapted to be pressed against the rim or flange of said reel and at the other end with a guiding device, a guide-roller at the pivoted end of said spring-arm for guiding the issuing material over said spring-arm, and a guide-roller journaled to said support and arranged to guide said material from the free end of said spring-arm to said reel, substantially as described.

20. In a perforating-machine suitable for making feed-holes in tapes, the combination with perforating mechanism adapted to perforate two tapes or two sets of tapes, and means for intermittently moving said tapes into position for each successive punching operation and for delivering the perforated tapes in a forward direction, of winding-up mechanism comprising a support, one or more pairs of vertical spindles mounted to rotate therein and provided with driving flanges or collars, one or more pairs of reels mounted on said spindles and between which the issuing tapes pass, each of said reels being provided at its lower end with a rim or flange in frictional driving contact with its spindle, one or more pairs of spring-arms each pivoted at one end to said support and provided at that end with a guide-pulley, with a guide, and with a brake-block adapted to bear against the rim or flange of the corresponding reel and at the opposite end with a guide, guide-pulleys journaled to said support and each arranged to lead the tape from a spring-arm to the corresponding reel, and driving means common to all the spindles, substantially as described.

Signed at Glasgow, Scotland, this 6th day of April, 1901.

FREDERICK GEORGE CREED.

Witnesses:
   JAMES WARNER RONALD,
   WALTER WATSON.